July 10, 1934.  W. FISCHER ET AL  1,966,006
BAND GUIDE FOR MACHINES FOR THE MANUFACTURE OF
THIN RAZOR BLADES FROM A CONTINUOUS BAND
Filed Feb. 13, 1932    2 Sheets-Sheet 1
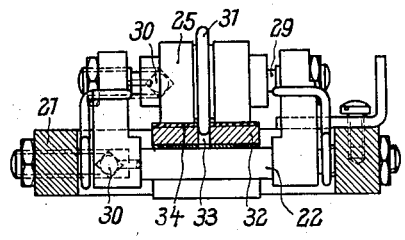
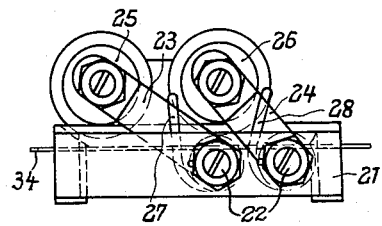
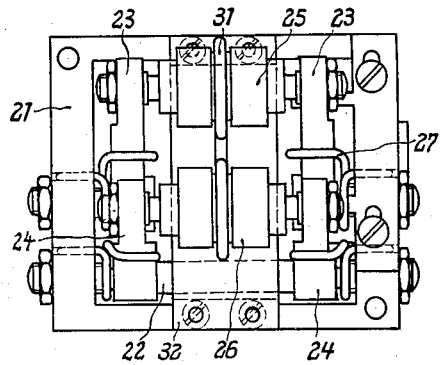
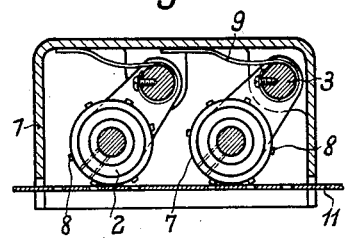
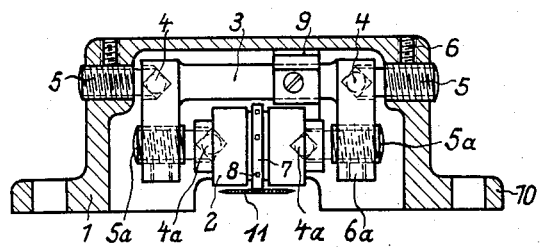
Inventors:
Willy Fischer
and Werner Tobias Patented July 10, 1934

1,966,006

UNITED STATES PATENT OFFICE 1,966,006

BAND GUIDE FOR MACHINES FOR THE MANUFACTURE OF THIN RAZOR BLADES FROM A CONTINUOUS BAND

Willy Fischer, Berlin-Hermsdorf, and Werner Tobias, Berlin-Sudende, Germany, assignors to Aktiebolaget Tonsor, Gottenborg, Sweden Application February 13, 1932, Serial No. 592,816
In Germany February 19, 1931

7 Claims. (Cl. 271—2.6)

When thin blades for safety razors are manufactured from a continuous steel band, this latter must be guided in the respective machine, the object of the guiding being to prevent lateral displacements of the band so that the cutting edges would be worked in an inaccurate manner. In the individual blades which, until they have been finished form a continuous band may be provided holes or slots of any desired shape which serve for holding the blade in the razor, as well as for the engagement of the guiding means for said band in the working machine.

The present invention relates to such guide means for the steel band, and its object is to guide the band in a continuous and uniform manner without entailing any increase of the power requisite for pulling the band through the machine, in that such an increase might cause tearing of the band in view of the only admissible slight strain to which the hardened steel band should be exposed and in view of the interruption of the proper service in such a case.

There are now used as guide members for the steel band, according to this invention, rollers engaging the holes or slots of the steel band, whereby lateral displacements of the latter are prevented. The rollers are provided with suitably located and shaped projections, such as lugs, noses or the like, or they are surrounded with a guide collar which is accommodated to the breadth of said holes or slots and engages these latter. Said guide rollers may bear said projections or collars either in their middle portion or at another place according to the places where there are in the steel band the said holes etc.

In order to have a reliable guide also for the shortest length of the band, it is suited to the purpose in view to arrange the two rollers of a pair of rollers so far remote from one another that always at least one thereof engages a guide aperture or slot of the band. That can be attained either by suitably dimensioning the levers carrying the rollers or by giving these levers a suitable angle of inclination relatively to one another, as well as to the steel band.

Another advantageous improvement is this that the two rollers of a pair of rollers are located one behind the other in a common tiltable support on the two sides laterally from the axis of tilting of this support, the arrangement being such that alternately one of said rollers engages the band with its flange or equivalent member, whereas the other roller is positively moved out of engagement with the band slot by the tilting motion of the said support. This motion itself is, with this constructional form of the machine, controlled by the slots or equivalent apertures of the band, whereby separate means, such as springs, weights or the like, for pressing the rollers into the band slots can be dispensed with, and the band is, therefore, relieved from the respective additional forces.

The invention comprises also a device permitting disengagement of the tiltable roller support or carrier with its two rollers from the band and to remove it easily if this should prove necessary from any cause, for instance making some adjustment or other alteration at the band working machine.

The invention is illustrated diagrammatically and by way of example in the accompanying drawings in which Figure 1 is a longitudinal section through a band guide designed according to this invention and Figure 2 is a transverse section therethrough, the guiding means consisting in this case of two rollers supported in a common carrier.

Figure 3 is a front-view,

Figure 4 a plan, and

Figure 5 a side-view of another constructional form comprising a pair of rollers and levers arranged in another manner than in the first-mentioned form.

Figure 8:
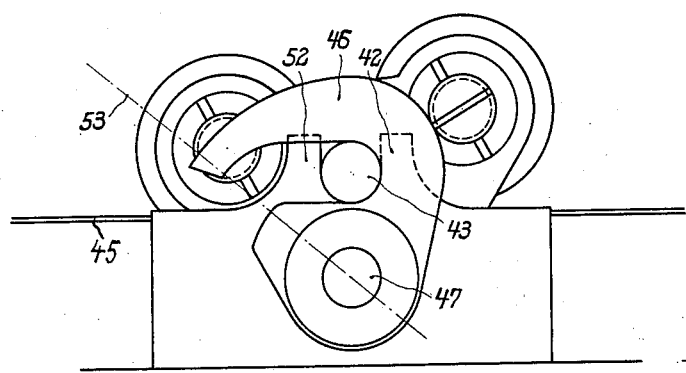

Figure 8 another side-view of a third constructional form in which the pair of rollers is supported in a tiltable carrier, all as more fully described hereinafter.

Referring to Figs. 1 and 2, 1 denotes a casing in which a plurality of guide rollers 2, preferably two, are supported between the legs of U-shaped levers 3, these latter being supported in said casing by the intermediary of balls 4. The rollers are journalled in the legs of said levers by means of balls 4a serving for anti-friction purposes, as well as for centering the respective members. The balls 4 and 4a are held respectively by means of separate threaded members 5 and 5a which themselves are secured in their places by threaded pins 6 and 6a.

The rollers 2 have in their middle a flange 7 which is provided with suitable projections, such as noses, teeth or the like 8, and the respective projections engage correspondingly located and shaped holes, slots or the like provided in the steel band 11 and preventing thereby lateral displacements of the same. The levers 3 are inclined relatively to the steel band 11 and are pressed against the same by means of springs 9 of suitable shape, for instance band springs, as in the example in question, the object of these springs being to prevent the rollers from being thrown upwardly when the rollers touch the edges of the slots of the band.

The casing 1 is affixed to the band working machine by means of its flanges 10 in such a position that it is located in the path of the band.

The flange 7 of the rollers, or the guide means 8 of the rollers respectively, must, of course, correspond to the size of the recesses in the steel band 11 and to the distances between the same. A particular shape and size of said recesses is not necessary but the shape and size thereof must, of course, be suited for the purpose in view. The position of the recesses in the steel band must, of course, correspond also with the position of the guide members 7, also as regards the position of the same relatively to the pins or teeth 8.

It is obvious that this steel band guide is of simple design and will operate perfectly reliable, the more, as its operation proceeds practically free from friction. The resistance which the rollers present is extraordinarily slight. A plurality of these devices and of uniform design may be provided for one steel-band working machine and may be attached thereto wherever desired for the purpose intended.

Referring now to the modification illustrated in Figs. 3–5, 21 denotes a frame provided with two bolts 22, of which each supports two levers 23 and 24 respectively. The levers 23 hold between their free ends a rotatable roll 25 and the levers 24 hold between their free ends a rotatable roll 26. The said levers are pressed against the frame 21 by means of suitably shaped springs 27 and 28. The bolt 22, as well as the bolt 29, which connect the free ends of the levers 23 and 24 with one another and carry the rolls 25 and 26 are centered by means of balls 30. Flanges 31 provided on the rolls are smooth and engage longitudinal slots of the steel band 34.

The distance between the said two rolls is, by suitably dimensioning the levers, so determined that at a certain definite remoteness and length of the guide slots of the band always at least one of the rolls engages a slot of the band. If any one of the two rolls extends with its flange 31 into a guide slot of the band, the other roll is located on the band between two consecutive slots. The band 34 itself is pulled through between the rolls and a guide plate 32 on which it can slide. The two rolls move alternately up and down while the band is being pulled through the guiding device. The levers 23, as well as the levers 24, are, as regards their length and their angular position, so arranged with respect to the surface of the guide plate 32 that they do not interfere with one another when they are moved up and down.

The levers 23 and 24 may be affixed to the bolts carrying them or they may be made integral with them so that the bolts are turnable with them.

In the guide plate 32 is a slot 33 into which extends the flange 31 of the rolls 25 and 26 if there is just a guide slot below the roll concerned. This roll band guide is preferably so arranged that the two rolls are located above the band in order to allow of an easy inspection and cleaning.

Figure 6:
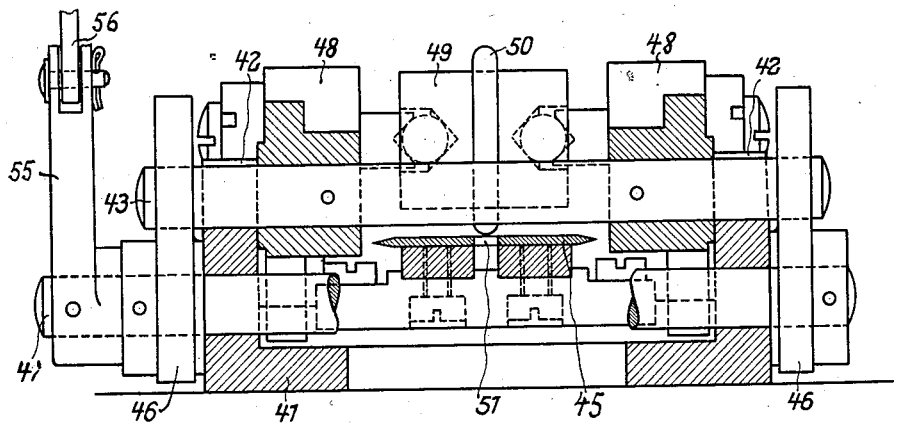
Figure 6 shows also a front-view, partly in section.
Figure 7:
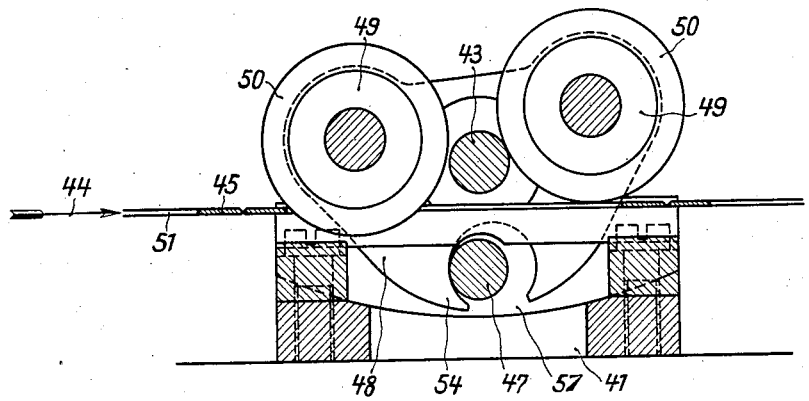
Figure 7 is a side-view, also partly in section.

In the further modification shown in Figs. 6–8 an axle 43 is supported in two forked bearings 42 rising from a base plate 41 and which are open at the top. Said axle lies transversely over the steel band 45 which arrives in the roll band guide in the direction indicated by the arrow 44. At the sides of the bearings 42 are locks 46 which are located upon another axle 47 located below the steel band. This axle can be turned in the base plate 41 of the device. On the axle (43) are two tiltable supports or carriers 48 which support or carry the two guide rolls 49 with their flanges 50. These latter may be made integral with said rolls, but it is as well possible to manufacture them separately and make them exchangeable. The flanges 50 engage the guide slots 51 of the individual blades of the band and prevent the steel band 45 in this way from being laterally displaced.

The gap between the rolls 49 is of such a size that if the band contacts, in the direction indicated by the arrow 44, at one end of the respective slot with the flange 50 of the left-hand roll 49 and, therefore, lifts this roll, the flange of the right-hand roll engages the next slot and now guides the band. When thereafter the end of this slot contacts with the flange of said right-hand roll, this roll will be lifted, whereby the flange of the left-hand roll will engage the slot just having arrived below it, and now this roll guides the band, and so on.

The locks 46 holding the axle 43 of the tiltable carrier or support 48 serve, in their working position, also for the following other purpose: When the steel band to be worked is being introduced into the machine or is being withdrawn from it, it is necessary or at least desirable to disengage at the time being all rolls from the band. Now, the rolls are disengaged from the band by the provision of a recess 52 in the locks 46, this recess being open at one side and being curved in the direction to that open side, the distance of the upper edge of the recess from the centre of the axis 47 being slightly enlarged at the open end of the recess as shown in Fig. 8. If the locks 46 are so turned that the axle 43 is located on the bolt radius 53 (Fig. 8), then said axle will be lifted to such an extent in the forked bearings 42 that the outer edge of the flange 50 will lie above the band 45.

On the bolt axle 47 may be fastened a lever 55 for turning this axle. If there is a plurality of these axles their levers 55 may be connected with one another by a rod 56 so that they all can be moved at the same time and, thus, the appertaining guide members may be disengaged from the band also at the same time.

In order to render the disengaging movement of the tiltable carrier 48 reliable, there is provided at its bottom surface a fork 54 which encompasses the bolt axle 47. In the working position of the roll guide said fork affords sufficient play for said carrier that this latter can swing to the one and the other side. When the carrier 48 is in its lifted position, the axle 47 is located in the narrow opening 57 of the fork 54 so that the carrier is held in a middle position in which the flanges or collars 50 of the two rolls 49 are disengaged from the steel band. If the locks 46 are further turned in the same direction, their slots 52 release the axle 43 completely so that it can be removed for the purpose of cleaning the rolls or exchanging their flanges.

We claim:—

1. A band guide for machines for the manufacture of thin razor blades from a continuous band having slots or equivalent apertures, comprising, in combination, two rolls arranged one behind the other and each having around it a collar adapted to engage said slots; a tiltable carrier, supporting said rolls on opposite sides of its axis of rotation, said rolls are so supported that always the collar of one thereof engages one of said slots, whereas the other collar is held outwardly turned by the metal between two of the slots so as thereby to guide the said band.

2. A band guide for machines for the manufacture of thin razor blades from a continuous band having slots or equivalent apertures, comprising, in combination, two rolls arranged one behind the other and each having a collar therearound adapted to engage said slots; a tiltable carrier, having its axis arranged above the band and supporting said rolls on opposite sides of its axis of rotation said rolls are so supported that always the collar of one of them engages one of said slots, whereas the collar of the other roll is disengaged from the band; and means supporting said carrier.

3. A band guide for machines for manufacturing thin razor blades from a steel band having slots or equivalent apertures along its direction, comprising, in combination, pairs of rolls, in which one roll is arranged behind the other, each roll having a collar adapted to engage any one of said apertures; a tiltable carrier carrying said rolls and having an axle about which it swings forked bearings for said carrier axle, the forked portions being open at their upper end; and turnable locks for holding the carrier axle in its working position in said bearings.

4. A band guide for machines for manufacturing thin razor blades from a steel band having successive individual apertures in its longitudinal direction comprising, in combination, pairs of rolls, in which one roll is arranged behind the other, each roll having a flange adapted to engage any one of said apertures; a tiltable carrier carrying said rolls and moving the said flanges into, and out of the apertures concerned at the time being; an axle about which said carrier tilts and forked bearings for said axle, the forked portions of said bearings being open at the top of the same; turnable locks for holding the carrier axle in its working position in said bearings; each of said locks having a slot that opens to one side of the axle, and the distance of the upper edge of which from the turning axis of the lock increases to the open end of the slot.

5. A band guide for machines for manufacturing thin razor blades from a continuous steel band having successive apertures in its longitudinal direction, comprising, in combination, pairs of rolls, in which one roll is located behind the other, each roll having a circumferential projection and being adapted to be moved towards, and away from, said band and to engage any of the apertures thereof; a tiltable carrier carrying said rolls, an axle about which said carrier tilts, forked bearings for said axle, the forked portion of said bearings being open at the top of the same; turnable locks so arranged as to secure said carrier in its working position; an axle about which said locks turn; and a forked member extending downwardly from said carrier over said axle, said forked member being so designed as to be adapted to hold the said carrier, if lifted, in a middle position in which the circumferential projections of both rolls are held above the apertures of the band, as set forth.

6. A band guide for machines for manufacturing thin razor blades from a continuous band having consecutive individual apertures, comprising, in combination, pairs of rolls, in which one roll is located behind the other, each roll having a collar adapted to engage any one of said apertures and being so arranged and supported as to be adapted to be moved towards, and away from, the apertures of the band; carriers holding said rolls, supports for said carriers, turnable locks for securing said carriers in its working position, an axle for said locks and a lever attached to said axle for turning it, substantially as set forth.

7. A band guide for machines for manufacturing thin razor blades from a continuous band having consecutive individual apertures, comprising, in combination, pairs of rolls, in which one roll is located behind the other, each roll having a collar adapted to engage any one of said apertures and being so arranged and supported as to be adapted to be moved towards, and away from, the apertures of the band; carriers holding said rolls, supports for said carriers, turnable locks for securing said carriers in its working position, axles for said locks, levers attached to said axles for turning them; and a rod connecting said latter levers with one another, substantially as set forth.

WILLY FISCHER.
WERNER TOBIAS.